United States Patent [19]

Takeuchi et al.

[11] Patent Number: 4,805,058

[45] Date of Patent: Feb. 14, 1989

[54] MAGNETIC ERASING HEAD

[75] Inventors: Giichi Takeuchi; Masanobu Sato; Hidesuke Miyairi, all of Miyagi, Japan

[73] Assignee: Sony Corporation, Tokyo, Japan

[21] Appl. No.: 28,077

[22] Filed: Mar. 20, 1987

Related U.S. Application Data

[63] Continuation of Ser. No. 664,217, Oct. 24, 1984.

[30] Foreign Application Priority Data

Oct. 24, 1983 [JP] Japan ................ 58-198932

[51] Int. Cl.⁴ .............. G11B 5/23; G11B 5/235; G11B 5/147
[52] U.S. Cl. ................ 360/119; 360/120; 360/126
[58] Field of Search .............. 360/118–123, 360/125, 126, 127

[56] References Cited

U.S. PATENT DOCUMENTS

| | | | |
|---|---|---|---|
| 4,176,384 | 11/1979 | Yang | 360/121 |
| 4,180,835 | 12/1979 | Okumura et al. | 360/118 |
| 4,205,356 | 5/1980 | Tanaka et al. | 360/118 |
| 4,316,228 | 2/1982 | Fujiwara et al. | 360/120 |
| 4,450,494 | 5/1984 | Fujiwara et al. | 360/125 |
| 4,476,509 | 10/1984 | Konishi et al. | 360/119 |
| 4,559,572 | 12/1985 | Kumasaka et al. | 360/126 |

FOREIGN PATENT DOCUMENTS

| | | | |
|---|---|---|---|
| 0125891 | 11/1984 | European Pat. Off. | 360/122 |
| 55-125521 | 9/1980 | Japan . | |
| 0017522 | 1/1983 | Japan | 360/120 |

OTHER PUBLICATIONS

W. Nystrom, "Hybrid Ferrite Head for High-Density Recording", IBM Technical Disclosure Bulletin, vol. 12, No. 12, May 1970.

Primary Examiner—Robert S. Tupper
Assistant Examiner—Melissa J. Koval
Attorney, Agent, or Firm—Hill, Van Santen, Steadman & Simpson

[57] ABSTRACT

A magnetic erasing head comprises a pair of magnetic core elements defining an erasing magnetic gap therebetween and facing to a travelling magnetic recording medium, a coil winding opening provided adjacent to the erasing magnetic gap on one of the magnetic core elements located on a trailing side relative to travelling of the magnetic recording medium and defining a depth of the erasing magnetic gap, and a coil wound through the coil winding opening to be provided an alternating current flow for generating erasing magnetic field at the erasing gap, the coil winding opening defining a core portion adjacent to the trailing side having a thickness substantially equal to the depth of the erasing magnetic gap.

2 Claims, 5 Drawing Sheets

MAGNETIC ERASING HEAD

This is a continuation of application Ser. No. 664,217, filed Oct. 24, 1984.

BACKGROUND OF THE INVENTION

1. Field of the Invention

The present invention relates to an A.C. magnetic erasing head where an A.C. magnetic field which gradually decreases is applied to erase a magnetically recorded signal on a magnetic recording medium so as to erase the signal, and more particularly to a magnetic erasing head in which the erasing efficiency is improved.

2. Description of the Prior Art

A rotating magnetic erasing head used as an erasing head for a video tape recorder (hereinafter referred to as "VTR") in the prior art is called a flying erase head which erases a magnetically recorded signal on a magnetic tape as magnetic recording medium by applying an A.C. magnetic field which gradually decreases for every recording track. Such magnetic recording head is formed generally as shown in FIG. 1(A) where ferrite core elements 2, 3 of metal oxide magnetic material are connected through a gap spacer 1 of non-magnetic material. The gap spacer 1 is formed by sputtering or the like provides a gap length t for the erasing head. The erasing head is provided with a coil winding hole 4 which is formed at the trailing side of the magnetic tape relative to the travelling direction as shown by an arrow X with respect to the erasing head for performing tracking operation. A coil wound through the coil winding head 4 is supplied with an erasing signal at a frequency of about 5 MHz, for example. A magnetic field which is sufficient to magnetize the magnetic tape to saturation is generated in the gap, and as the magnetic tape travels the magnetic field which is applied to the magnetic tape decreases gradually from a magnetic field sufficient to magnetize the magnetic tape to saturation and thereby the residual magnetization of the magnetic tape goes to zero and the magnetically recorded signal on the magnetic tape is erased.

The distribution of the magnetic field intensity generated by the magnetic gap of the magnetic erasing head has the characteristics shown in FIG. 1(B) where the magnetic field intensity distribution becomes sharp at the trailing side (region designated by f) in the travelling direction of the tape with respect to the magnetic gap forming position. Consequently, the erasing signal of a prescribed frequency may be recorded on the magnetic tape or such re-recording phenomenon may occur such that a signal recorded on the magnetic tape which being erased is re-recorded with high-frequency bias on the magnetic tape using the erasing signal of the prescribed frequency as a high-frequency bias.

Since the signal recorded on the magnetic tape is required to be high density, the magnetic tape such as so-called metal magnetic tape comprising metal magnetic powders having large coercive force is used. In order to erase the signal recorded on the metal magnetic tape, magnetic material having higher saturation magnetic flux density than ferrite, for example, magnetic alloy of Fe-Al-Si series, i.e. so-called sendust alloy is used in a part of the core element.

However, if magnetic material having high saturation magnetic flux density such as sendust alloy is used, the distribution of the magnetic field intensity generated from the magnetic gap will become more sharp thereby the phenomenon where the erasing signal is recorded on the magnetic tape or the re-recording phenomenon as above described will significantly occur. In so-called evaporated metal magnetic tape where metal magnetic material such as Co is formed on a non-magnetic substrate by means of a physical vapor deposition technique such as vacuum evaporation, such phenomenon occurs more significantly because the magnetic layer is thin.

As above described, the magnetic erasing head in the prior art has disadvantages in that the erasing efficiency is not sufficient.

SUMMARY OF THE INVENTION

It is an object of the present invention to provide an improved magnetic erasing head.

It is another object of the present invention to provide a magnetic erasing head having improved erasing efficiency.

It is a further object of the present invention to provide an A.C. magnetic erasing head suitable to erase signals on a magnetic recording medium having high coercive force.

It is still further object of the present invention to provide an A.C. magnetic erasing head which prevents re-recording of signals which are to be erased and/or erasing signal on a magnetic recording medium.

According to one aspect of the present invention, there is provided a magnetic erasing head which comprises a pair of magnetic core elements defining an erasing magnetic gap therebetween and facing a travelling magnetic recording medium, a coil winding opening is provided adjacent to the erasing magnetic gap on one of the magnetic core elements and is located on a trailing side relative to travelling of the magnetic recording medium and defines the depth of the erasing magnetic gap, and a coil is wound through the coil winding opening and is provided with an alternating current for generating an erasing magnetic field in the erasing gap, and the coil winding opening defining a core portion adjacent the trailing side having a thickness which is substantially equal to the depth of the erasing magnetic gap.

DESCRIPTION OF THE PREFERRED EMBODIMENTS

An embodiment of the present invention will now be described referring to the accompanying drawings.

Figure 1A:
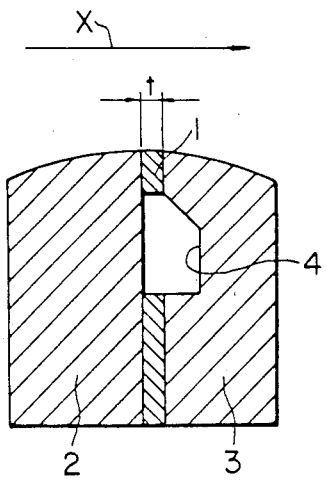
FIG. 1(A) is a schematic sectional view of a magnetic erasing head in the prior art.
Figure 1B:
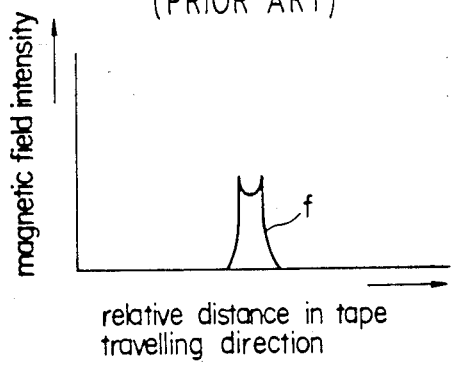
FIG. 1(B) is a characteristic diagram illustrating magnetic field intensity distribution of the magnetic erasing head in FIG. 1(A)
Figure 2A:
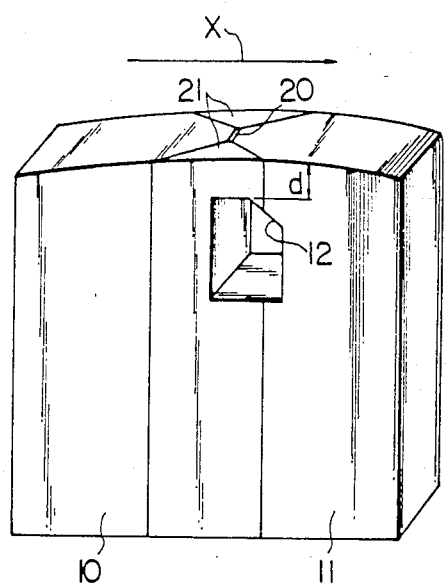
FIG. 2(A) is a perspective view of a magnetic erasing head according to the invention.
Figure 2B:
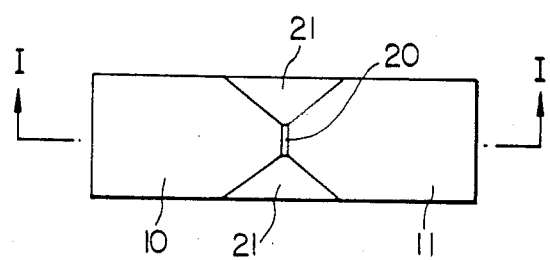
FIG. 2(B) is a view of the magnetic erasing head illustrating a surface opposed to a magnetic tape according to the invention.
Figure 3:
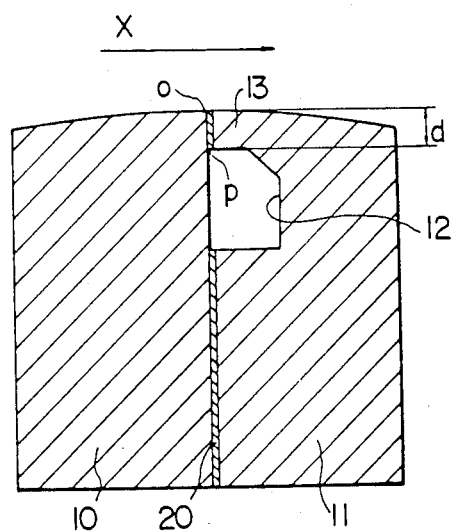
FIG. 3 is a sectional view taken in line I—I of FIG. 2(B)

FIG. 2(A) shows a perspective view of a magnetic erasing head according to the invention, and FIG. 3 shows a sectional view taken in line I—I of FIG. 2(B). The magnetic erasing head is used, for example, as a rotating erasing head for a VTR, and a magnetically recorded signal on a magnetic tape, for example, as a magnetic recording medium is erased by an erasing signal with a frequency of 5 MHz for example. The magnetic erasing head is composed of a pair of core elements 10, 11 of soft magnetic material, e.g. Mn-Zn ferrite, and a coil winding hole 12 is formed on the core element 11 at the trailing side in the magnetic tape relative to the direction of travel as is shown by an arrow X with respect to the erasig head for performing a tracking operation. The pair of core elements 10, 11 are connected by melt-bonding through a gap spacer 20 formed by sputtering a film of non-magnetic material, e.g. silicon dioxide $SiO_2$ using glass 21 of non-magnetic material. The gap spacer 20 provides a gap length t, and an erasing magnetic field is generated in the gap.

A coil is wound through the coil winding hole 12 and is supplied with an erasing signal, and the coil winding hole 12 defines the gap depth d. In other words, the coil winding hole 12 is formed in the core element 11 such that an arm 13 is formed on the magnetic tape contacting side, and the distance between the upper end (o) and the lower end (p) of the end surface of the arm 13, i.e., the abutting surface of the gap spacer 20 with the core element 10, becomes the gap depth d. That is, the gap depth d being the distance between the upper end (o) and the lower end (p) corresponds to the length of the abutting surface in the perpendicular direction to the contacting surface with the magnetic tape.

The thickness of the arm 13 in the depth direction adjacent to the magnetic gap is substantially equal to the gap depth in the direction of the trailing side. The surface continuing to the point defining the gap depth d of the coil winding hole 12, i.e. the lower end forms the region having a thickness which is substantially equal to the gap depth adjacent to the magnetic gap of the core element 11.

Figure 4A:
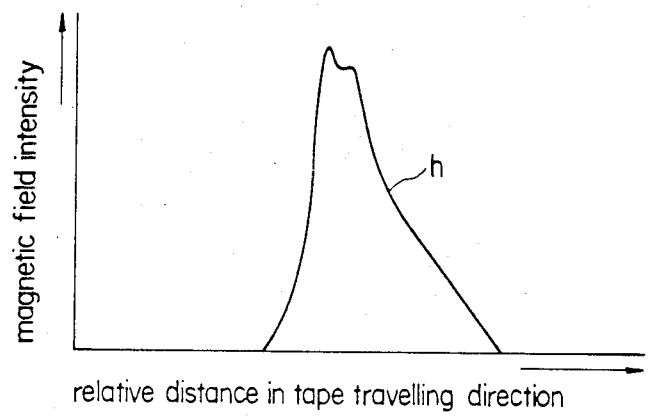
FIG. 4(A) is a characteristic diagram illustrating magnetic field intensity distribution of the magnetic erasing head in FIG. 2(A)
Figure 4B:
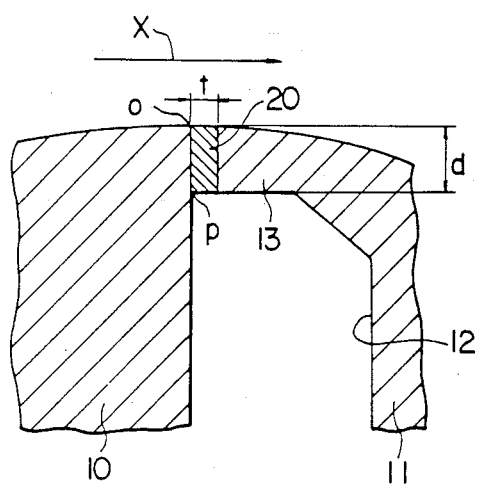
FIG. 4(B) is a fragmentary sectional view taken in line I—I of FIG. 2(B)

In the magnetic erasing head constituted as above described, the distribution of the erasing magnetic field intensity generated by the gap becomes as shown in FIG. 4(A) where the distribution of the magnetic field intensity becomes asymmetric with respect to the gap forming position. That is, the field intensity distribution at the head trailing side (region designated by h in the figure) in the direction of travel of the tape has a gentle slope. In FIG. 4(A) the magnetic field intensity is the ordinate and the distance of tape travel is the abscissa. FIG. 4(B) is shown with a position corresponding to FIG. 4(A) and is a fragmentary sectional view taken in line I—I of FIG. 2(B). The reason that the magnetic field intensity distribution has a gentle slope at the trailing side is that as the erasing current flowing in the coil wound through the coil winding hole 12 increases, the arm 13 of the core element 11 is gradually magnetically saturated and the magnetically saturated region extends is the direction of the magnetic tape trailing side as compared to the conventional erasing head. Consequently, when the magnetic field applied to the magnetic tape decreases gradually sufficiently to saturate the magnetic tape as the magnetic tape travels and the residual magnetization on the magnetic tape approaches zero, neither the erasing signal of the prescribed frequency is recorded on the magnetic tape nor a re-recording phenomenon occurs that the signal remains on the tape.

Figure 5:
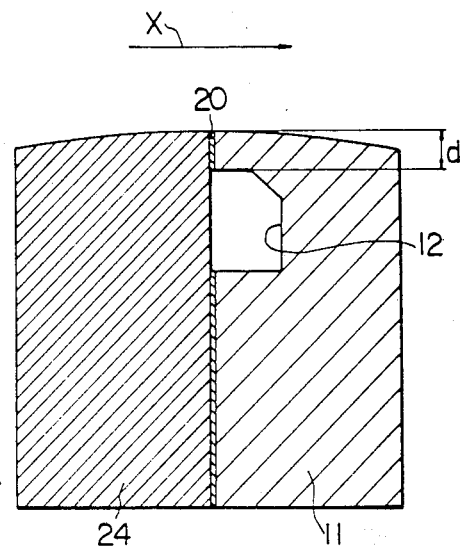
FIG. 5 and FIG. 6 are sectional view of the magnetic erasing head illustrating other embodiment of the invention.

As shown in FIG. 5, a core element 24 at the leading side of the magnetic tape relative to the direction of travel may be constituted using soft magnetic material having a high saturation magnetic flux density, for example, Fe-Al-Si series alloy, i.e., so-called sendust alloy, in order to correspond to metal magnetic tape having high coercive force Hc.

Figure 6:
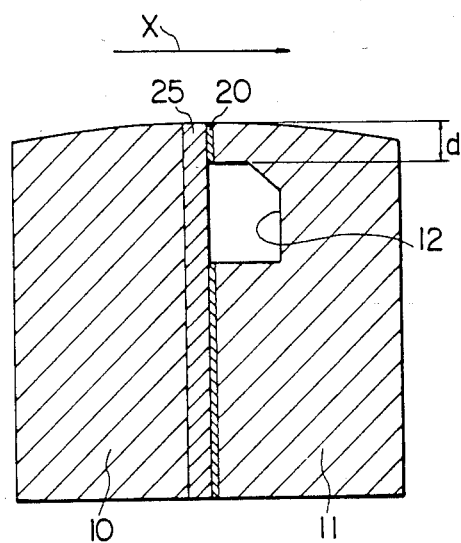

As shown in FIG. 6, a thin film 25 of magnetic material such as sendust may be formed only at the leading side of the gap spacer 20. In this construction, the magnetic field intensity generated from the magnetic gap can be strengthened, and if material having a higher saturation magnetic flux density is located at the leading side with respect to the gap spacer or material having a lower saturation magnetic flux density is located at the trailing side, the magnetic field intensity distribution at the trailing side will have a gentle slope. Consequently, when magnetic material of a high saturation magnetic flux density is used corresponding to the metal magnetic tape having high coercive force, the phenomenon of recording of the erasing signal or the re-recording phenomenon of the prior art can be effectively prevented. Also such phenomenon particularly occurring at the evaporated metal magnetic tape of this magnetic layer can be prevented, and the erasing efficiency to erase the signal recorded on the evaporated metal magnetic tape can be improved according to the invention.

Different material for the core elements 10, 11, such as Mn-Zn ferrite as well as Ni-Zn ferrite may be used. For the magnetic material having a high saturation magnetic flux density, in addition to an alloy of iron-aluminium-silicon series (Fe-Al-Si series), so-called sendust as above described, amorphous magnetic material having a composition represented by MX may be used. If M designates Fe, Co (cobalt), Ni, and X designates for example Si, B (boron), P (phosporous), C (carbon). Specific examples of the amorphous material is magnetic material of the Fe-Co-Si-B series.

The magnetic erasing head of the invention may be used not only as a rotating erasing head for a VTR but also as a fixed type erasing head.

As can be clearly understood from the above description, according to the invention, a pair of core elements of soft magnetic material are connected through a gap spacer, and the core element at trailing side of a magnetic recording medium is provided with a coil winding hole, and a surface continuing to a point which defines the gap depth of the coil winding hole forms a region having a thickness which is substantially equal to the gap depth adjacent the magnetic gap of the core element at the trailing edge. Consequently, the distribution of the magnetic field intensity generated by the magnetic gap has a gentle slope in the direction of the trailing edge with respect to the gap forming position, thereby neither the erasing signal is recorded on the magnetic medium nor does a re-recording phenomenon occur such that signals are recorded on the magnetic recording medium which are being erased are re-recorded on the magnetic recording medium using the erasing signal as bias. Thus the erasing efficiency of the magnetic erasing head can be improved according to the invention.

What is claimed is:

1. A magnetic erasing head comprising a pair of magnetic core halves which define an erasing gap therebetween and forming a common surface which faces a travelling magnetic recording medium, said pair of magnetic core halves comprising, a leading side core and a trailing side core with respect to the travelling direction of said magnetic recording medium, said leading side core formed of a first portion comprising a magnetic ferrite and a second portion comprising a thin film of magnetic alloy which has a saturation magnetic flux density which is higher than the magnetic flux density of said first portion, said second portion located adjacent said erasing gap, said trailing side core formed with a notch which is adjacent to said erasing gap, said erasing gap being formed between a planar surface of said thin film of magnetic alloy and a planar surface of said trailing side core, and a coil wound through said notch being applied with an alternating erasing current for generating erasing magnetic field at said erasing gap, wherein the gap depth is in a direction perpendicular to said common surface of said notch and said trailing side core has a core portion adjacent to said erasing gap which has a thickness in the plane of said common surface and in a direction perpendicular to said gap which is substantially equal to said gap depth.

2. A magnetic erasing head according to claim 1 wherein said magnetic alloy is a Fe-Al-Si alloy.

* * * * *